CONTENT ADDRESSABLE MEMORY

Filed March 29, 1963 4 Sheets-Sheet 1

INVENTORS
RALPH J. KOERNER
ALFRED D. SCARBROUGH
BY Arthur Freilich
ATTORNEY

CONTENT ADDRESSABLE MEMORY
Filed March 29, 1963 4 Sheets-Sheet 2
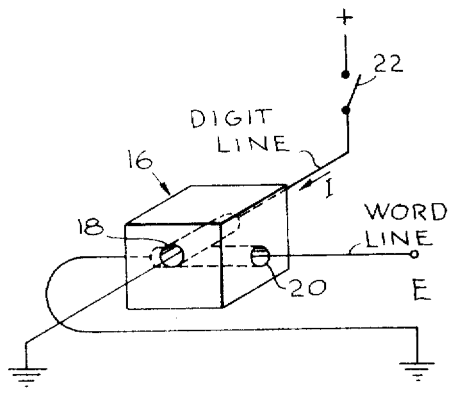
Fig. 2(a)
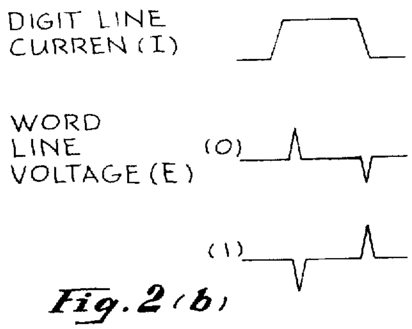
Fig. 2(b)
| | SEARCH BIT | STORED BIT | SWITCH CORE 50 | GENERATE INHIBIT PULSE |
|---|---|---|---|---|
| EQUAL TO OR GREATER THAN | 0 | 0 | | ✓ |
| | | 1 | ✓ | ✓ |
| | 1 | 0 | ✓ | |
| | | 1 | | |
| EQUAL TO OR LESS THAN | 0 | 0 | | |
| | | 1 | ✓ | |
| | 1 | 0 | ✓ | ✓ |
| | | 1 | | ✓ |
| EQUAL TO | 0 | 0 | | |
| | | 1 | ✓ | |
| | 1 | 0 | ✓ | |
| | | 1 | | |
Fig. 5
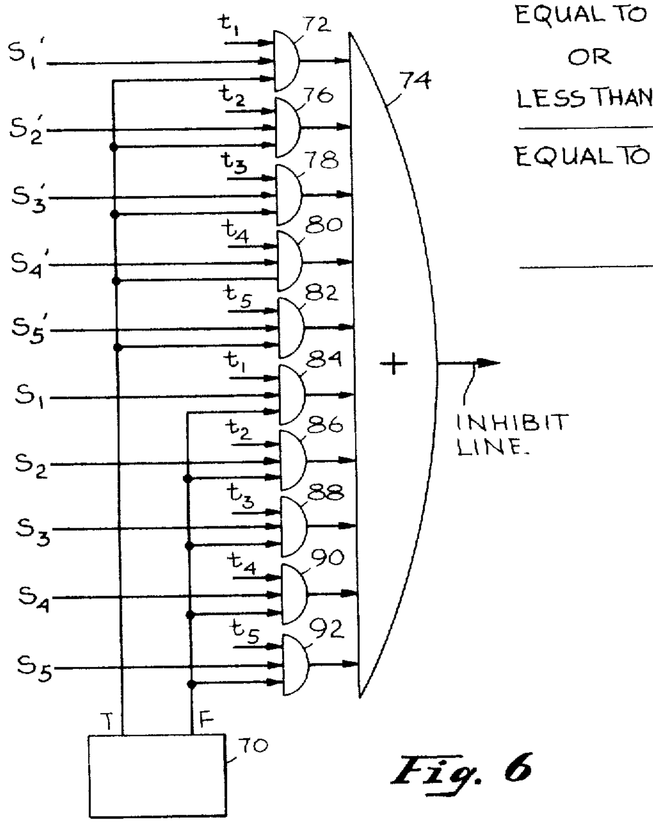
Fig. 6
RALPH J. KOERNER
ALFRED D. SCARBROUGH
INVENTORS
BY Arthur Freilich
ATTORNEY INVENTORS
RALPH J. KOERNER
ALFRED D. SCARBROUGH
BY Arthur Frailich
ATTORNEY INVENTORS
RALPH J. KOERNER
ALFRED D. SCARBROUGH
BY Arthur Freilich
ATTORNEY United States Patent Office 3,297,995
Patented Jan. 10, 1967

3,297,995
CONTENT ADDRESSABLE MEMORY
Ralph J. Koerner, Canoga Park, and Alfred D. Scarbrough, Northridge, Calif., assignors, by mesne assignments, to The Bunker-Ramo Corporation, Stamford, Conn., a corporation of Delaware
Filed Mar. 29, 1963, Ser. No. 269,009
23 Claims. (Cl. 340—172.5)

Figure 1:
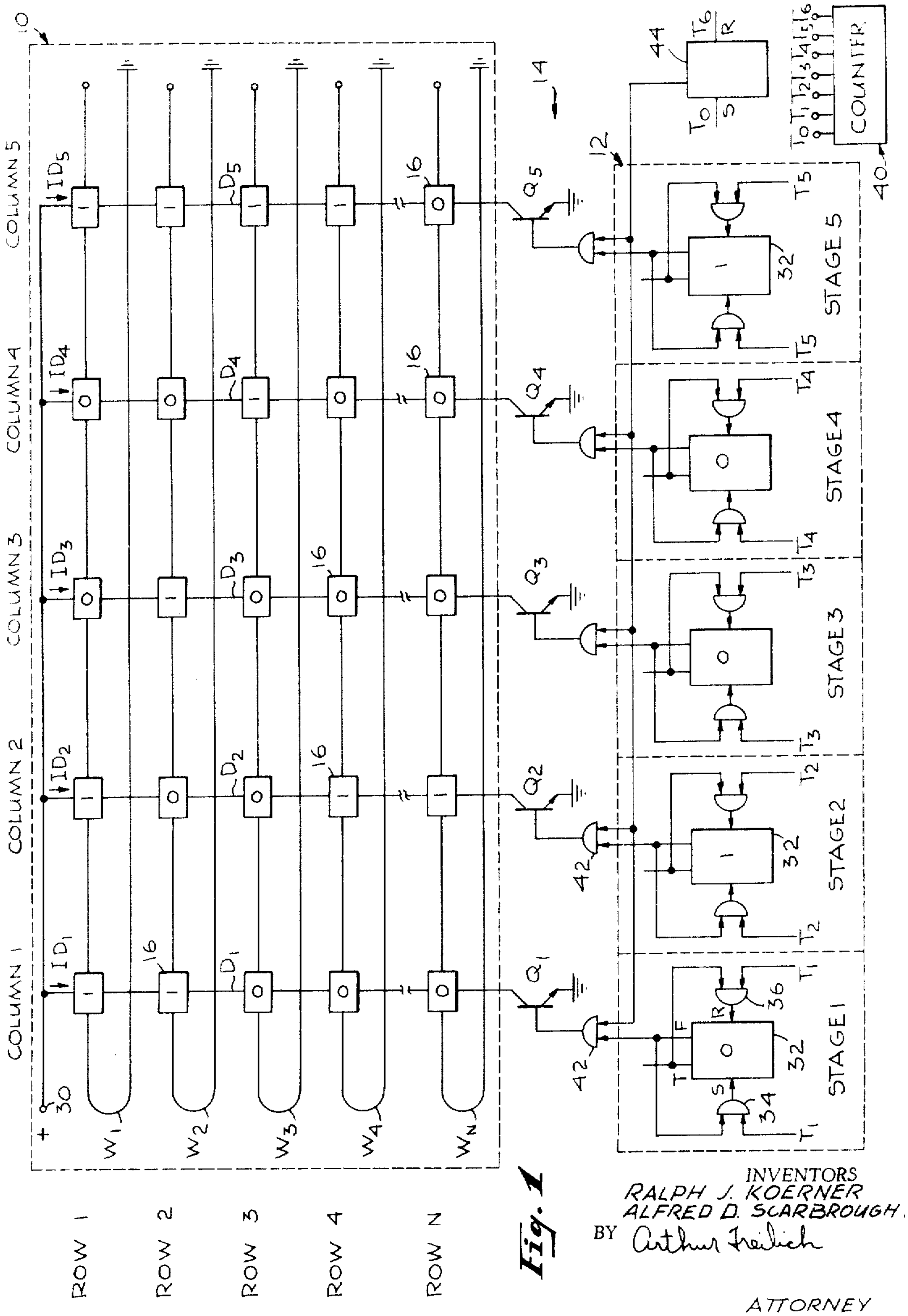

This invention relates generally to digital memories and more particularly to improvements in content addressable type memories, such memories being characterized by having the ability to permit all words stored in the memory to be searched in parallel, i.e., simultaneously.

U.S. Patent No. 3,031,650 discloses some basic content addressable memory implementations and discusses the characteristics which distinguish such memories from conventional digital memories. Briefly, the significant distinguishing characteristic is that each memory location in a content addressable memory is not uniquely identified by an address as in conventional digital memories but instead content addressable memory locations are selected on the basis of information stored therein; i.e. the contents thereof. Hence, the name content addressable memory.

As a result of selecting locations on the basis of stored information, memory search times can be considerably reduced at the cost of some additional hardware. That is, in situations where it is desired to select those locations, out of N locations in memory, storing information (words) identical to a search word, information identifying those locations can be derived in one memory access period instead of the N such periods required by conventional digital memories. More particularly, whereas it is necessary in a conventional digital memory to sequentially access the contents of each location (a word) and compare each such word for identity with a search word, comparison of the search word with all the stored words can be simultaneously effected in a content addressable memory.

Essentially, a content addressable memory operates by causing a search signal representative of a search word bit to be applied simultaneously to all memory location elements storing bits of corresponding significance. Some type of logic means is provided at each element in the memory, such means being operable to generate a signal to indicate whether the bit stored in the associated element is the same as or different from the corresponding search bit being sought. All logic means associated with elements of a single memory location are connected to a common word line and by sensing the signals applied to a word line, a determination can be made as to whether or not the word stored in the memory location associated with the word line is identical to the search word.

The above-mentioned patent contemplates at least two embodiments of a content addressable memory. In a first such embodiment utilization is made of flip-flops as the memory storage elements. First and second AND gates are connected to each flip-flop and match signals are generated by applying the search signal representative of a search bit representing a binary "1" (it is pointed out the terms binary "1" and "0" herein are respectively used only to represent two distinct states of an element and it is to be understood that these terms are arbitrarily applied and do not designate a particular physical state) together with the true output of each flip-flop storing a bit of corresponding significance to the first of its associated AND gates. Similarly, the search signal representative of a search bit representing a binary "0" and the false output of each flip-flop storing a bit of corresponding significance are applied to the second of its associated AND gates. As a consequence, either the first or second AND gate will provide an output (match) signal whenever the bit stored in the flip-flop and the search bit are the same. By connecting the outputs of the two AND gates associated with each flip-flop to the input of an OR gate and by connecting the outputs of all OR gates associated with flip-flops of the same location to the input of an AND gate, a true output signal from the latter gate can be interpreted as meaning the stored word associated therewith is identical to the search word. As should be apparent in such an embodiment, match signals can be generated without changing the storage content of the flip-flop; that is, the flip-flop is read nondestructively.

It is particularly desirable to read the storage elements in a content addressable memory in a nondestructive manner because of the fact that all of the stored words are read simultaneously and as a result a substantial amount of hardware would be required to restore the read information into all of the memory elements if destructive readout devices, such as single aperture magnetic cores were used. Although it is apparent that a content addressable memory comprised of flip-flops could be made to function very effectively, the cost of such a memory might be prohibitive if constructed on a large scale.

As a consequence, the above-identified patent discloses an additional embodiment employing multi-apertured magnetic cores which can also be read nondestructively and which can in addition inherently provide the necessary logical comparison function. Inasmuch as it is necessary to be able to generate either a match or mismatch signal (which of course requires some switching action on the part of the cores) regardless of whether the stored bit constitutes a binary "0" or "1," dependent on the state of the corresponding search bit, and further inasmuch as magnetic elements do not lend themselves to the concurrent representation of complementary output states, it is necessary to provide two magnetic cores per each stored bit of information. The two cores respectively store true and complementary states corresponding to the true and false outputs of the flip-flops utilized in the above-mentioned first embodiment.

In a similar manner, all other known prior art content addressable memories require that both true and complementary manifestations be available for each stored information bit in order to permit either match or mismatch signals to be generated regardless of the state of the stored bit.

In view of the above, it is an object of this invention to provide a content addressable memory which is less expensive and more reliable than heretofore known content addressable memories by virtue of the fact that it requires only one magnetic storage element per each stored bit of information, instead of two.

As previously pointed out, all storage elements of a single content addressable memory location are connected to a common word line. It is apparent that when all elements in a location are simultaneously interrogated, the signal-to-noise ratio on the word line associated therewith suffers because of the fact that output signals and noise signals on each word line are effectively summed. The resulting poor signal-to-noise ratio necessitates that reasonably well-designed and expensive word line sensing equipment must be provided.

In view of this, it is an object of the present invention to provide a content addressable memory which reduces the design and cost requirements of sensing equipment utilized to detect signals on the memory's word lines by providing much higher signal-to-noise ratios than were provided by prior art content addressable memories.

It is a further object of this invention to provide a content addressable memory which in addition to having the capability of performing equality searches, affords the opportunity, with little increase in hardware, of performing "greater than" and "less than" magnitude searches.

Briefly, in accordance with the invention, advantage is taken of a little known characteristic of a class of magnetic elements employing orthogonal magnetic fields. Typical of this class is the Biax which is discussed by C. L. Wanlass and S. D. Wanlass in a paper entitled "Biax High Speed Magnetic Computer Element," 1959, WESCON, Convention Record, Part IV, pp. 40, 54.

Normally, when a magntic element of this class is interrogated, two successive output pulses of opposite polarity are provided and the state of the element is sensed by determining whether a positive going or negative going output pulse occurred first. The characteristic which has been recognized is that these output pulses occur concurrently with a change in the interrogation current level; i.e., when the interrgation current level is changed in a first direction, e.g., increased, a positive going output pulse is developed if the element is in a first state (arbitrarily storing a binary "0") and a negative going output pulse is developed if the element is in a second state (arbitrarily storing a binary "1"). On the other hand, when the interrogation current level is changed in a second direction, e.g., decreased, a positive going output pulse is developed if the element stores a binary "1" and a negative going output pulse is developed if the element stores a binary "0." For simplicity, positive and negative "going" pulses will hereafter merely be referred to as positive and negative pulses, it being understood that in actuality of D.C. level might be present which would make the former terms technically more accurate.

The content addressable memory disclosed herein takes advantage of this recognized characteristic by using an interrogation current changing in a first direction to represent a first state of a search bit and an interrogation current changing in an opposite direction to represent a second state of a search bit inasmuch as a consequence of this, output signals of a first polarity can always be interpreted as either a match or mismatch signal.

In a preferred embodiment of the invention disclosed herein, an increasing interrogation current level is used to represent a search word bit of "1" and a decreasing interrogation current level is used to represent a search word bit of "0." As a consequence of this, positive output signals generated by the elements can always be interpreted as mismatch signals.

By processing the bits of the search word sequentially, that is by increasing or decreasing interrogation currents respectively representative of different search word bits separately, only one element in each location can possibly provide an output pulse on the location word line at any one time and therefore the signal-to-noise ratio on the word line is exceptionally high. Moreover, by processing the search word bits in order of decreasing significance, "greater than" and "less than" magnitude comparisons can be accomplished by merely looking at the state of the search word bit associated with the first mismatch signal developed in any location. That is, if the first mismatch signal on a word line is developed when the search word bit being processed is a "1" the magnitude of the associated stored word must necessarily be less than the magnitude of the search word and on the other hand if the first mismatch signal is developed when the search word bit being processed is a "0" the stored word must necessarily be greater than the search word.

In a preferred embodiment of the invention, a rectangular matrix of Biax elements is provided with all of the elements common to each row being interconnected by a word line unique to that row and all of the elements common to each column being interconnected by a digit line unique to that column. A search register including a plurality of flip-flop circuits equal in number to the number of columns in the matrix, is provided. Each of the flip-flop circuits is connected through appropriate gating circuitry to a different transistor, each transistor being respectively connected to a different digit line.

Prior to performing a search, interrogation current is initiated in those digit lines corresponding to search register bit positions storing a "0." Timing means are provided to sequentially activate the gating circuitry associated with each flip-flop, in order of decreasing significance, so as to effectively cut off the interrogation current in each digit line associated with a search bit of "0" and initiate interrogation current in each digit line associated with a search bit of "1." A different sensing device can be connected to each word line, each device including a first bistable element responsive to positive pulses appearing on the word sense line to switch to a second state. At the termination of a search, equality between a stored word and the search word can be determined by merely determining whether the first bistable element associated with the stored word has switched to the second state or has remained in the first state. It is well to point out that the first bistable element need only respond to the initial positive pulse appearing on the word line and can ignore any subsequent positive or negative pulses.

In order to extend the capabilities of the content addressable memory to permit it to perform "greater than" and "less than" magnitude comparison searches in addition to equality searches, each of the sensing devices is provided with a second bistable element connected so as to be switched in response to the associated first bistable element being switched unless an inhibit signal is simultaneously applied to the second bistable element. That is, if the second bistable elements are all initially in a first state and their assumption of a second state indicates mismatch, an inhibit signal will be generated, if for example a "greater than" search is being conducted, when the interrogation current in a digit line associated with a search bit of "0" is being decreased. In other words, when the search bit is equal to "0" and a mismatch signal is generated by the first bistable element, the corresponding stored bit is necessarily equal to binary "1" which of course, indicates that the stored word is greater in magnitude than the search word and as a consequence the stored word can be considered as matching the search word according to the "greater than" criteria established. Therefore, the second bistable element should be inhibited from switching to a second or mismatch state.

In a first embodiment of the sensing device disclosed, first and second single aperture magnetic cores are respectively utilized as the first and second bistable elements. A drive winding on the first core is connected through an amplifier to a word line. A sense winding on the first core is coupled to the second core such that the switching of the first core from a first to a second state will cause the second core to switch to a second state unless a pulse on an inhibit line threaded through the second core prevents the second core from switching.

In a second embodiment of the sensing device, a tunnel diode is utilized as the first bistable element, and a word line is connected thereto in such a manner that a positive pulse on the word line shifts the tunnel diode to a second or high voltage state. The high voltage state of the tunnel diode can be utilized to forward bias a transistor switch so as to establish current in a transformer first primary winding. The current in the first primary winding causes a pulse to be induced in a transformer secondary winding which in turn switches a second bistable element, such as a flip-flop, to a second state. An inhibit line can be connected to a transformer second primary winding to, however, prevent the pulse from being induced in the secondary winding at appropriate times.

Figure 3B:
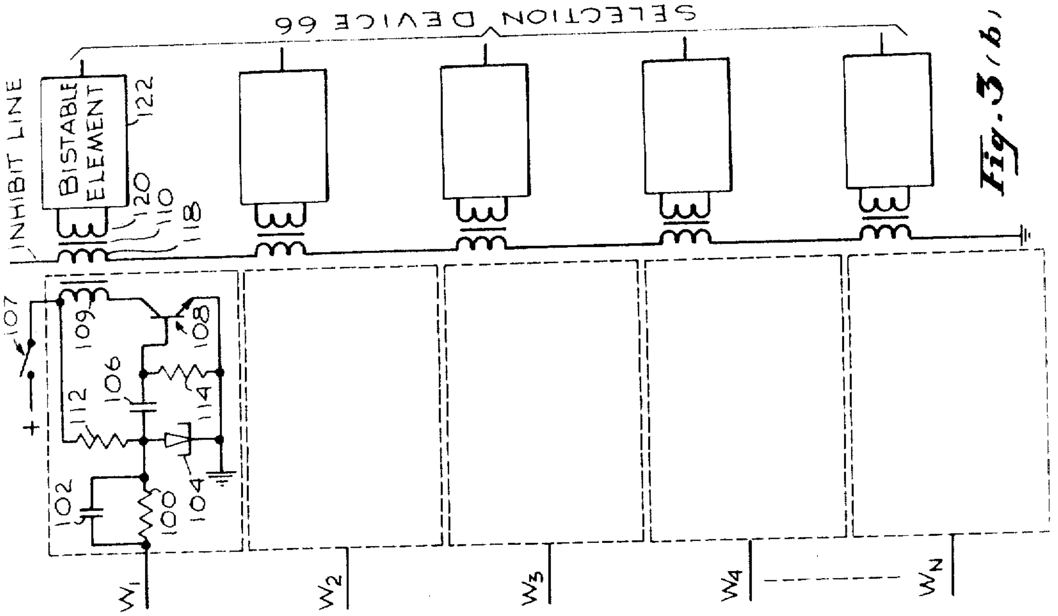
Figure 3A:
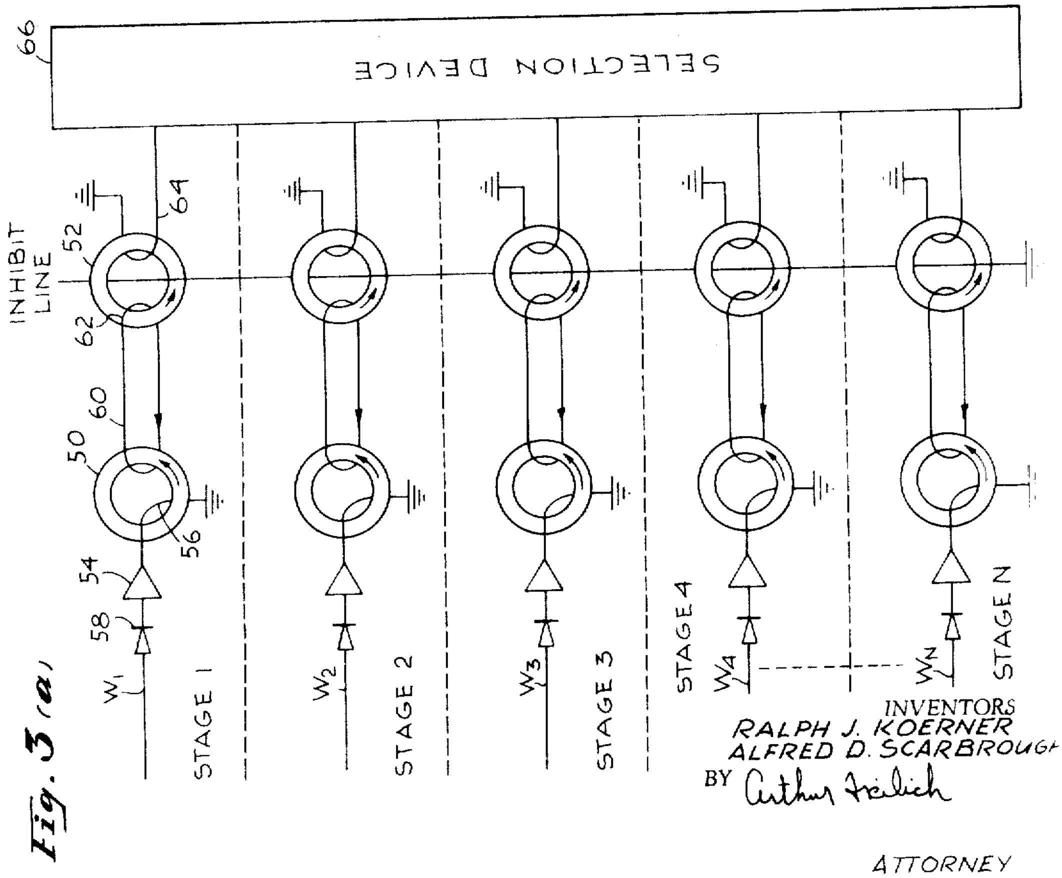
Figure 4:
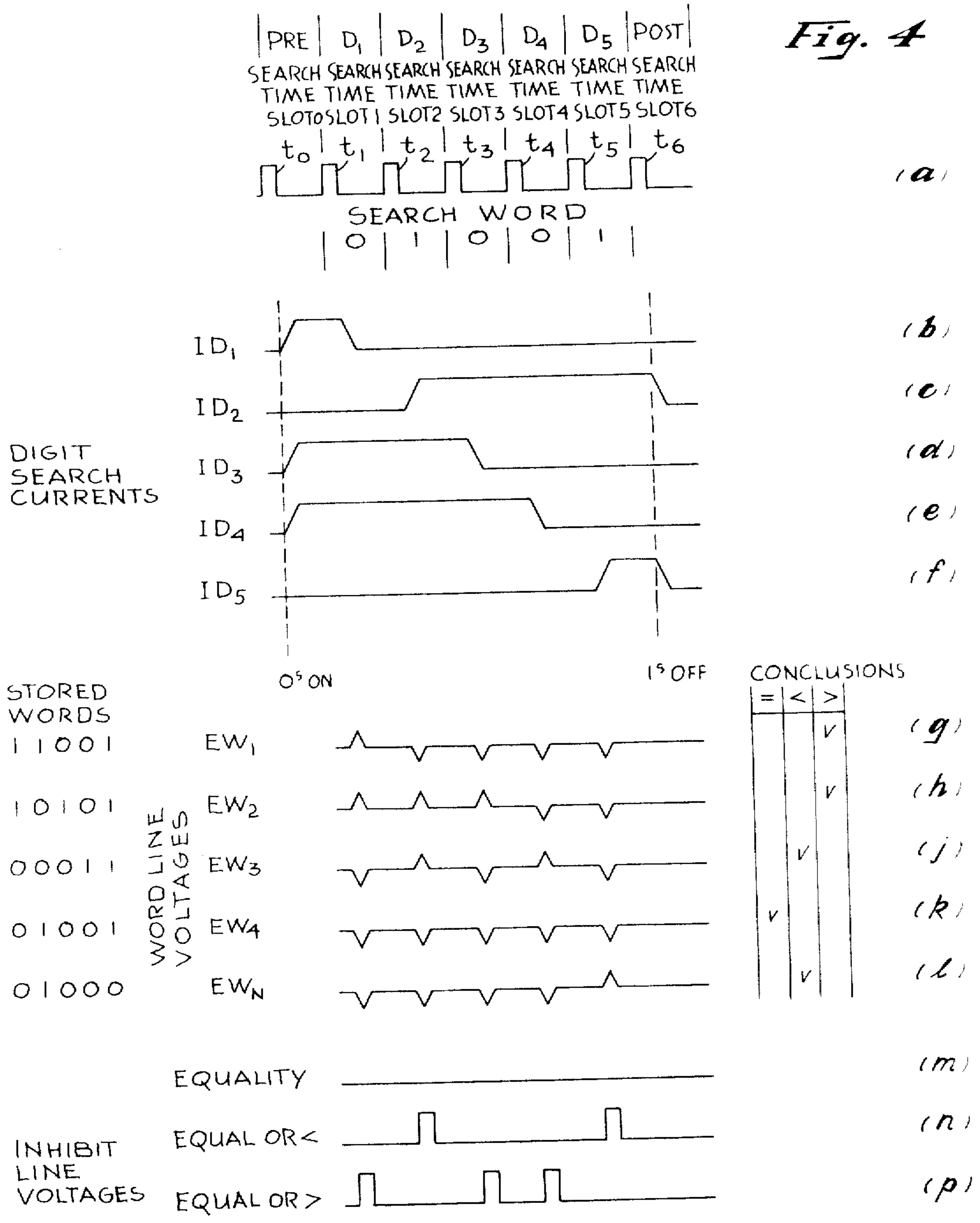

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a schematic diagram of the content addressable memory constructed in accordance with the present invention illustrating the interconnection between the search register and memory elements;

FIGURE 2*a* is a perspective view of a typical Biax element showing the manner in which the digit line and word line are threaded therethrough;

FIGURE 2*b* is a waveform chart showing output voltage waveforms developed on the Biax word line as a result of the application of the illustrated search current waveforms to the digit line;

FIGURE 3*a* is a schematic diagram illustrating a first embodiment of a sensing apparatus;

FIGURE 3*b* is a schematic diagram illustrating a second embodiment of a sensing apparatus;

FIGURE 4 comprises a plurality of waveform charts illustrating an exemplary operation of the content addressable memory of FIGURE 1;

FIGURE 5 is a table describing the conditions under which inhibit signals should be generated; and FIGURE 6 is a schematic diagram illustrating logic means for generating an inhibit signal for utilization in the sensing apparatus of FIGURE 3*a* or 3*b*.

Attention is now called to FIGURE 1 which illustrates a content addressable memory constructed in accordance with the present invention and including a memory matrix 10, a search register 12, and interconnecting circuit means 14.

The exemplary matrix 10 includes N rows of memory elements, each row comprised of five memory elements. Each of the memory elements 16 constitutes a bistable device thereby enabling it to assume first and second states respectively representative of binary digits or bits, namely "0" and "1." Each of the matrix rows can appropriately be referred to as a memory location, each location being capable of storing a bit pattern constituting a single word. Although the exemplary memory illustrated herein makes use of a five bit word length, it is pointed out that a memory of any arbitrary word length can be constructed in accordance with the invention.

Each of the matrix columns consists of a plurality of memory elements each of which serves to store information of corresponding significance in a different row or memory location. That is, words may in fact represent numerical quantities and it is common practice to place bits of corresponding significance in such words in correspondingly positioned memory elements. For example, binary information can be stored in the elements of the memory matrix such that the elements in column 1 of the matrix respectively store the most significant bit of each stored word and the elements of column 2 through 5 in the matrix respectively store bits of decreasing significance.

A digit line $D_1$ is associated with all of the memory elements 16 of column 1 of the matrix. Similarly, digit lines $D_2$, $D_3$, $D_4$, and $D_5$ are each correspondingly associated with all of the memory elements of respectively different ones of the columns 2, 3, 4, 5 of the matrix. On the other hand, a word line $W_1$ is associated with all of the memory elements in row 1 of the matrix. Similarly, word lines $W_2$, $W_3$, $W_4$, and $W_N$ are correspondingly associated with the memory elements of rows 2, 3, 4, and N of the matrix.

Attention is now momentarily called to FIGURE 2*a* showing a perspective view of a structural device constituting a memory element which could be utilized in the memory matrix 10 of FIGURE 1 the operational characteristics of such a memory element being illustrated in FIGURE 2*b*.

FIGURE 2*a* illustrates a magnetic memory element 16 commonly called a Biax. Such an element comprises a block of magnetic material having apertures 18 and 20 extending therethrough perpendicularly to one another. A digit line is threaded through the aperture 18 while a word line is threaded through the aperture 20. The digit line is utilized as a conduction path for carrying current to interrogate the state of the element 16 and as a consequence is connected between ground and a switch 22 which in turn is connected to a source of positive potential. The word line is utilized to sense the state of the element 16. At least one additional line (not shown) would in practice be threaded through the element 16 in order to write information therein. However, for the purposes of the discussion herein, it will be assumed that information has already been written into the memory element 16 and that the element is either in a first state of magnetization arbitrarily referred to as a binary "0" or second state of magnetization arbitrarily referred to as a binary "1."

In order to determine the state of the element 16, the switch 22 in the digit line is closed to thereby initiate a positive current pulse on the digit line as illustrated in FIGURE 2*b*. If it is initially assumed that the memory element 16 stores a "0," as a result of the interrogation current, a positive voltage pulse will be initially generated on the word line followed by the generation of a negative pulse. If on the other hand the element 16 stores a "1," the establishment of current in the digit line initially causes a negative voltage pulse to appear on the word line followed by the appearance of a positive pulse.

As explained in the above referenced article regarding the Biax, state interrogations can be accomplished nondestructively. That is, although the current driven through the digit line will induce voltage pulses in the word line, the current will not change the state of the memory element 16. The state of the element of course can be determined by sensing whether the initial pulse appearing on the word line is positive or negative. If a positive pulse is initially generated followed by a negative pulse, the element 16 of course stores a "0" and on the other hand, if a negative voltage pulse is initially generated followed by a positive pulse, the element 16 stores a "1."

It is to be further noted from FIGURE 2*b* that the voltage pulses on the word line are generated concurrently with a change in the current in the digit line. That is, if the element 16 stores a "0" a positive voltage pulse is generated during an increase in current in the digit line and a negative voltage pulse is generated during a decrease in current in the digit line. No pulse appears on the word line when the current in the digit line is not changing. It is this characteristic of the Biax and other memory elements employing orthogonal magnetic fields which is exploited in the present invention to provide a considerably improved content addressable memory.

In addition to the Biax, other memory elements are available which have substantially the same characteristics as those illustrated in FIGURE 2*b*. For example, a wire memory element as disclosed by T. R. Long in an article entitled "Electro-Deposited Memory Elements For A Nondestructive Memory" which appeared in the Journal of Applied Physics, vol. 31 (May 1960), pp. 123–124 possesses the necessary characteristics and can be utilized in the content addressable memory of FIGURE 1; that is, in response to an increase in current in a digit line, a positive voltage pulse is generated on a word line if a "0" is stored and a negative pulse is generated on the word line if a "1" is stored and on the other hand in response to a decrease in current on the digit line a negative voltage pulse is generated on the word line if a "0" is stored and a positive pulse is generated on the word line if a "1" is stored.

Returning to FIGURE 1, it is pointed out that each of the digit lines is connected between a terminal 30, which in turn is connected to a positive potential source, and the collector of a respective transistor. That is, digit line $D_1$ is connected to the collector of transistor $Q_1$, digit line $D_2$ is connected to the collector of transistor $Q_2$, and digit lines $D_3$, $D_4$, and $D_5$ are respectively connected to the collectors of transistors $Q_3$, $Q_4$, and $Q_5$. The emitters of the transistors $Q_1$–$Q_5$ are all connected to ground.

The search register 12 includes five stages, each stage of which corresponds to one of the memory matrix columns. All of the search register stages are substantially identical and each includes a bistable element 32 which can comprise a conventional set-reset flip-flop circuit having set and reset and reset input terminals and true and false output terminals. It will be assumed that the flip-flop circuits are so designed that when a circuit stores a binary "1," its true output terminal will be at a high potential and when a circuit stores a binary "0," its false output terminal will be at a high potential.

Each of the flip-flop circuits 32 has the output of an AND gate 34 connected to the set input terminal thereof and the output of an AND gate 36 connected to the reset input terminal thereof. The false output terminal of the flip-flop is connected to the input of AND gate 34 while the true output terminal of the flip-flop is connected to the input of AND gate 36.

A counter 40 is provided which is capable of successively applying pulses to each of its output terminals $T_0$, $T_1$, $T_2$, $T_3$, $T_4$, $T_5$, $T_6$, the pulses being respectively designated by the nomenclature $t_0$, $t_1$, $t_2$, $t_3$, $t_4$, $t_5$, $t_6$. The output terminal $T_1$ of the counter 40 is connected to the input of both AND gates 34 and 36 of stage 1 of the search register. The false output terminal of the flip-flop circuit of stage 1 is connected to the input of AND gate 42. The output of this AND gate 42 is connected to the base of transistor $Q_1$. The other search register stages are similarly connected; e.g., the output terminal $T_2$ of counter 40 is connected to the AND gates 34 and 36 of search register stage 2 and the output of the AND gate 42 associated therewith is connected to the base of transistor $Q_2$.

A search flip-flop 44 is provided which can also be of the conventional set-reset type. The output terminal $T_0$ of counter 40 is connected to the set input terminal of flip-flop 44 while the output terminal $T_6$ of counter 40 is connected to the reset input terminal of flip-flop 44. The true output terminal of flip-flop 44 is connected to the input of all of the AND gates 42.

In order to understand the operation of the content addressable memory of FIGURE 1, let it be assumed that the memory elements of each of the memory locations store the bits as indicated by the numbers within the boxes in FIGURE 1 representative of the memory elements. Let it further be assumed that it is desired to determine whether or not any of the words stored in the memory locations are identical to the search word stored in the search register 12, the search word being represented by the numbers disposed in the boxes representative of the flip-flop circuits 32. For ease in comprehension, FIGURES 1 and 4 should be considered together in the light of the following explanation. Line *a* of FIGURE 4 illustrates the timing pulses provided by counter 40. The timing pulses $T_0$–$T_6$ may be considered as defining time slots so that e.g. a zero time slot is defined between the leading edge of timing pulse $T_0$ and between the leading edge of timing pulse $T_1$. The zero time slot may be considered as a presearch time slot in which appropriate search condi tions are set up in the equipment of FIGURE 1 but during which no searching is actually performed. The time slots 1 through 5 are utilized to respectively search the elements of columns 1 through 5 and compare those elements with the correspondingly positioned bits in the search register. The sixth time slot may be considered as a post-search time slot during which the equipment of FIGURE 1 is restored to a quiescent condition.

It will be recalled from FIGURE 2*b* that an increasing current in a digit line resulted in the generation of a positive voltage pulse on a word line if the element stored a binary "0" and a negative pulse if the element stored a binary "1" and on the other hand that a decrease in the current in the digit line resulted in the generation of a negative voltage pulse on the word line if a binary "0" was stored and a positive pulse if a binary "1" was stored. It can therefore be seen that if the current on a digit line is increased when the corresponding bit of the search word is a "1," and decreased if the corresponding bit of the search word is a "0," positive voltage pulses resulting on the word lines can be interpreted as meaning that the memory elements generating the positive pulses store a different binary bit than the corresponding search bit.

In accordance with the above statement, in response to timing pulse $t_0$, transistors $Q_1$, $Q_3$, and $Q_4$ are forward-biased to establish current in digit lines $D_1$, $D_3$, and $D_4$. It should be apparent that transistors $Q_1$, $Q_3$, and $Q_4$ are forward-biased as a result of the generation of timing pulse $t_0$ due to the fact that the false output terminals of the flip-flop circuits of stages 1, 3, and 4 of the search register are at a high potential representative of a stored "0," and the true output terminal of flip-flop 44 enables AND gates 42 to thereby apply high potentials to the bases of transistors $Q_1$, $Q_3$, and $Q_4$. Since stages 2 and 5 of the search register store binary "1's," transistors $Q_2$ and $Q_5$ are not forward-biased and no current will exist in digit lines $D_2$ and $D_5$.

In response to the generation of timing pulse $t_1$, the flip-flop circuit 32 of stage 1 of the search register will switch from its binary "0" state to a binary "1" state inasmuch as the AND gate 34 will provide a signal to the set input terminal thereof. As a consequence of course, transistor $Q_1$ will be cut off (line *b*, FIGURE 4) so as to decrease the current in digit line $D_1$. As a result, positive voltage pulses (lines *g* and *h*, FIGURE 4) will be generated on the word lines $W_1$ and $W_2$ while negative voltage pulses (lines *j*, *k*, *l*, FIGURE 4) will be generated on the word lines $W_3$, $W_4$ and $W_N$. It should be apparent from what has been so far set forth that the positive voltage pulses generated on word lines $W_1$ and $W_2$ can be interpreted as meaning that the elements in column 1 of memory locations 1 and 2 store a binary bit which is different from the bit stored in stage 1 of the search register.

In response to timing pulse $t_2$, the flip-flop circuit 32 of stage 2 of the search register is switched from a binary "1" state to a binary "0" state and thus forward biases transistor $Q_2$ to thereby increase the current (line *c*, FIGURE 4) in the digit line $D_2$. As a consequence, positive voltage pulses are generated on word lines 2 and 3, (lines *h* and *j*, FIGURE 4) indicating that the elements in column 2 of memory locations 2 and 3 store binary bits different from that stored by the second satge of the search register.

In response to the generation of timing pulse $t_3$, transistor $Q_3$ is cut off in the same manner that transistor $Q_1$ was previously cut off. As a consequence, a positive pulse is generated on word line 2 (line *h*, FIGURE 4). In response to the generation of timing pulse $t_4$, transistor $Q_4$ is cut off and as a consequence a positive pulse is generated on word line 3 (line *j*, FIGURE 4). In response to the generation of timing pulse $t_5$, transistor $Q_5$ is biased on and as a consequence the current is increased in digit line $D_5$ thereby causing a positive pulse to be generated on word line $W_N$. In response to the generation of timing pulse $t_6$, transistors $Q_2$ and $Q_5$ are cut off (lines *c* and *f*, FIGURE 4).

It is to be noted from lines *g*, *h*, *j*, *k*, and *l* of FIGURE 4 that positive voltage pulses were generated on each of the word lines other than word line $W_4$. The voltage pulses can of course be interpreted as meaning that only the word stored in memory location 4 matches the search word stored in the search register. Accordingly, on line *k* of the table designated "Conclusions," the word in location 4 is checked as being equal to the search word.

It accordingly has been shown that the content addressable memory of FIGURE 1 can be operated to simultaneously search all the words stored in memory to determine whether or not any of the stored words match (i.e. for equality) a search word stored in the search register. Although all of the words were searched simultaneously in the sense that corresponding bits of all of the words were simultaneously considered, it is to be noted that the bits of each word were considered sequentially. As a consequence, it was not possible for more than one element during any one time slot to generate a pulse on a particular word line. Consequently, the signal-to-noise ratio on each of the word lines is exceptionally high.

In addition to utilizing the content addressable memory of FIGURE 1 to determine whether any of the stored words are equal to the search word, the content addressable memory can be easily employed to locate stored words whose magnitude is "greater than" or "less than" the search word. In order to understand how this can be accomplished, consider the positive voltage pulses generated on word lines 1 and 2 during time slot 1 when a current in digit line 1 representative of a search bit equal to binary "0" is being processed. It follows that if the stored bit is not equal to the search bit, as evidenced by the generation of a positive pulse on the word line, and if the search bit is a binary "0," then the stored bit must necessarily be greater than the search bit. Similarly, as evidenced by the positive pulses on word lines $W_2$ and $W_3$ generated during time slot 2, when a search bit equal to a binary "1" is processed, it is apparent that if the stored bits are not equal to the search bit, then the stored bit must necesarily be less than the search bit.

It should of course be apparent that whether the magnitude of a complete word is greater than or less than the magnitude of another complete word is determined solely by the most significant bit in the stored word which differs from the corresponding bit in the search word. That is, upon the generation of the positive voltage pulse in time slot 1 on word line $W_1$, it can be immediately concluded that the magnitude of the word stored in location 1 is greater than the search word. Similarly, the positive pulse in time slot 1 on word line $W_2$ can be interpreted as meaning that the magnitude of the word stored in location 2 is greater than the search word. On the other hand, the posiitve voltage pulse generated on word line $W_3$ in time slot 2 can be interpreted as meaning that the magnitude of the word stored in memory location 3 is less than the search word. The positive pulse generated on word line $W_2$ during time slot 2 can be ignored for purposes of determining whether the word in location 2 is greater or less than the search word inasmuch as the positive pulse generated on word line 2 during time slot 1 conclusively established that the word stored in memory location 2 was greater than the search word. A consideration of the positive voltage pulses on the lines *g, h, j, k,* and *l* of FIGURE 4 together with a consideration of the value of the search bits processed during the time slots in which the positive pulses were generated, leads to the conclusions indicated in the "Conclusions" table. That is, the words stored in memory locations 1 and 2 are greater than the search word, the words stored in memory locations 3 and N are less than the search word, and the word stored in memory location 4 as previously noted, is equal to the search word.

Although it is a relatively easy task to determine from the waveforms of FIGURE 4 whether each stored word is equal to, greater than, or less than the search word, it is of course desirable to provide sensing apparatus adapted to be connected to the word lines for automatically sensing the pulses on the word lines and for operating some indicating means to indicate whether each of the stored words matches or mismatches the search word within some established criterion. More particularly, it is often desirable to be able to search through a memory storing words to determine which words have magnitudes which are equal to or greater than a search word and which words have magnitudes which are equal to or less than a search word. If an "equal to or greater than" criterion is established, all stored words having a magnitude which is equal to or greater than the search word are considered to match the search word and all stored words having magnitudes which are less than the search word are considered to mismatch the search word. On the other hand, if an "equal to or less than" criterion is established, all stored words whose magnitudes are equal to or less than the search word are considered to match the search word and all stored words having magnitudes which are greater than the search word are considered to mismatch the search word.

Attention is now called to FIGURE 3*a* which illustrates a first embodiment of a sensing apparatus which can be utilized with the content addressable memory of FIGURE 1 for monitoring the word lines and generating appropriate match and mismatch signals in accordance with an "equal to or greater than" or "equal to or less than" criterion established.

The sensing apparatus of FIGURE 3*a* includes N stages, each of which is adapted to be connected to a different one of the word lines of FIGURE 1. Inasmuch as all the stages of FIGURE 3*a* are identical, detailed attention will be directed only to the stage connected to word line $W_1$. Each stage includes first and second bistable devices 50 and 52 which comprise conventional single aperture magnetic cores. The word line $W_1$ is connected through a diode 58 and ground referenced amplifier 54 to a first terminal of a drive winding 56 on core 50. The second terminal of drive winding 56 is connected to ground. A sense winding 60 is threaded through core 50 and is connected to a drive winding 62 threaded through core 52. An inhibit line is threaded through the cores 52 of each of the N stages. A sense winding 64 is threaded through core 52 and connected to a selection device 66.

In the operation of the sensing apparatus of FIGURE 3*a*, let it be initially assumed that all of the cores 50 and 52 are in a first state of magnetization as represented by the arrows drawn thereon. The cores can be initially switched to the first state in response to timing pulse $t_0$ by the application of appropriate pulses to respective drive windings (not shown). When a positive voltage pulse is generated on word line $W_1$ and amplified by amplifier 54, a current is established in drive winding 56 which acts to switch the core 50 to the second abovementioned state. Subsequent negative voltage pulses appearing on word line $W_1$ will be prevented by diode 58 from causing the core 50 to switch back to the first state.

The switching of core 50 from the first to the second state of magnetization, will induce a pulse in the sense winding 60 which will be coupled to the drive winding 62 of core 52. The application of the pulse to the drive winding 62 will act to switch the core 52 from the first to the second state of its magnetization unless a current pulse is simultaneously applied to the inhibit line to effectively counteract the flux change in core 52 which would otherwise be initiated by the current in drive winding 62.

For an understanding of when and why current pulses should be applied to the inhibit line, attention is called to the table illustrated in FIGURE 5. Assume initially that it is merely desired to determine which stored words are equal to the search word. If it be assumed that a match between a stored word and a search word is indicated by the core 52 remaining in its first state of magnetization after the completion of a search, it is essential to never generate a pulse on the inhibit line. That is, when an equality criterion is employed, it is desired that the magnetic core 52 switch to a second state of magnetization in response to any positive pulses appearing on the associated word line. Consequently, line *m* of FIGURE 4 indicates that no inhibit pulses are generated when an equality criterion is employed.

However, assume that a search is being conducted and an "equal to or less than" criterion is being employed. In such a case, it is desired to inhibit the switching of core 52 during those time slots when the search bit is a "1" as shown in the table of FIGURE 5 and line *n* of FIGURE 4. This is so because positive pulses developed on the word line during the time slots when the search bit is a "1" means of course that the stored bit is a zero which in turn means that the stored word is in fact equal to or less than the search word and as a consequence the stored word matches the search word and therefore the core 52 should remain in its first state of magnetization indicating a match condition.

In an opposite manner, as described by the table of FIGURE 6 and illustrated in line *p* of FIGURE 4, when the search criterion is "equal to or greater than," inhibit pulses should be generated during those time slots when search bits equal to "0" are being processed.

FIGURE 6 illustrates a logical circuit for appropriately generating the inhibit pulses illustrated in lines *n* and *p* of FIGURE 4. More particularly, a conventional set-reset flip-flop 70 is provided which is switched to a true state whenever an "equal to or greater than" criterion is to be established, and which is switched to a false state whenever an "equal to or less than" criteria is to be established. Assume that an "equal to or greater than" criterion is to be established and consequently the flip-flop 70 is in a true state. In response to the generation of a timing pulse $t_1$, AND gate 72 will provide an output pulse if the most significant search bit $S_1$ is a binary "0." The output of AND gate 72 is connected to the input of an OR gate 74 whose output is connected to the inhibit line. Similarly, the true output terminal of flip-flop 70 is connected to the inputs of AND gates 76, 78, 80, and 82 along with the respective output terminals $T_2$, $T_3$, $T_4$, and $T_5$ of counter 40. It should be apparent that so long as flip-flop 70 is in a true state, that is manifesting an "equal to or greater than" search comparison criterion, a pulse will be generated on the inhibit line during each time slot in which the search bit is equal to "0." If, for example, all of the search bits are equal to "1," inhibit pulses will be generated during every time slot and as a consequence none of the cores 52 could ever be switched to their mismatch states. This of course is correct inasmuch as no stored words could possibly be greater than a search word all of whose bits were equal to binary "1."

The false output terminal of flip-flop 70 is connected to the inputs of each of the AND gates 84, 86, 88, 90, and 92. The true output terminals of the flip-flops of the search register are respectively applied to the inputs of the AND gates 84, 86, 88, 90, and 92 together with the output terminal $T_1$ through $T_5$ of counter 40. In response to the generation of timing pulse $t_1$, and assuming the flip-flop 70 to be in a false state, OR gate 74 will generate an inhibit pulse if the first search bit $S_1$ is a binary "1." This means that if the search criterion is "equal to or less than," the core 52 is prevented from switching to a mismatch state if the first search bit is a binary "1" inasmuch as a positive voltage pulse on a word line developed when the search bit is a "1" and the criterion is "equal to or less than" actually constitutes a match condition and the core 52 should be prevented from switching since such switching would specify a mismatch condition. It should be understood that in order to conduct only an "equality" search, the inhibit signal should never be generated. In order to prevent the inhibit signal from being generated, it can be applied to an AND gate (not shown) together with the complement of a signal indicating "equality" only.

The selection device 66 comprises a commutator type device for sequentially selecting the cores 52 which remain in a first state of magnetization after the content addressable memory has completed a search. Any one of several differently designed devices could perform the functions required of the device 66. A typical device 66 would be connected to each of the cores 52 by both a drive winding and a sense winding. Each of the drive windings could be sequentially pulsed and the corresponding sense windings can be sensed to thereby sequentially determine the states of each of the cores 52. The cores 52 remaining in a first state of magnetization of course indicate which of the words in the memory matched the search word. As a result of determining the matching words, the selection device can cause subsequent operations to be performed, such as generating coded address signals identifying the matching words, reading out selected words from another memory, or performing any of innumerable other operations.

Attention is now called to FIGURE 3*b* which illustrates a second embodiment of the sensing apparatus adapted to be utilized with the content addressable memory of FIGURE 1. Again, the sensing apparatus is comprised of N stages, each stage being connected to a different one of the word lines. Since all of the stages are identical, detailed attention will be directed only to the stage connected to word line $W_1$.

Word line $W_1$ is connected through a parallel RC circuit including resistor 100 and capacitor 102 to the first terminal of a tunnel diode 104 whose second terminal is grounded. The first terminal of the tunnel diode 104 is in turn connected through a capacitor 106 to the base of a transistor switch 108. The emitter of the transistor 108 is connected to ground while the collector of the transistor 108 is connected through a first primary winding 109, wound about transformer core 110, through a switch 107 to a positive potential source. A resistor 112 connects the positive potential source to the first terminal of the tunnel diode 104. A resistor 114 connects the base of the transistor 108 to ground.

A second primary winding 118 on the transformer core 110 is connected to an inhibit line which in turn is connected to the output of the previously mentioned OR gate 74 of FIGURE 6. A secondary winding 120 on the transformer core 110 is connected to a bistable element 122 which in turn is connected to the selection device 66.

In the operation of the selection apparatus of FIGURE 3*b*, assume that switch 107 closes in response to the generation of timing pulse $t_0$ and that as a consequence the tunnel diode 104 assumes its first state, that is a high current, low voltage state. When a positive voltage pulse is applied to the word line $W_1$, it is coupled through the RC circuit to the first terminal of tunnel diode 104 and as a consequence switches the tunnel diode to its second state, that is a low current, high voltage state. Once the tunnel diode has switched to a high voltage state, subsequent positive or negative pulses on the word line $W_1$, will not change the state of the tunnel diode. The switching of the tunnel diode 104 to its high voltage state, couples a positive voltage with respect to ground through capacitor 106, to the base of transistor 108. As a consequence, current is initiated in the collector-emitter path of transistor 108 and the first primary winding 109 which is connected in series therewith. The current initiated in the first primary winding 109 will induce a pulse in the secondary winding 120 which in turn will switch the bistable element 122 from a first to a second (mismatch) state unless the inhibit line simultaneously applies a pulse to the second primary winding 118. As previously described, pulses are applied to the inhibit line when an "equal to or greater than" search criterion is being employed and the search bit is a "0," or when an "equal to or less than" search criterion is being employed and the search bit is a "1." The selection device 66 can then, upon the termination of the search period, that is after the occurence of timing pulse $t_6$, sequentially sample the bistable elements 122 to determine which stored words match the search word, within the terms of the established criterion.

From the foregoing, it should be apparent that advantage has been taken of a not too well recognized feature of a certain class of memory elements e.g. the Biax, to enable the storage content of such elements to be easily compared for identity with other stored information. Moreover these comparison principles have been extended for utilization in a content addressable memory whereby the content addressable memory can be appropriately operated utilizing only one magnetic memory element per stored bit of information instead of two elements as has heretofore been required. Further, it has been shown that considerably more favorable signal-to-noise ratios can be provided on the word lines of a content addressable memory by sequentially considering the bits of each word, rather than considering all the bits simultaneously. In addition to significantly increasing the signal-to-noise ratio on the word lines and thereby minimizing the design and cost requirements of sensing apparatus adapted to be connected to the word lines, it has been shown how the content addressable memory can be operated to make "greater than" and "less than" magnitude comparisons in addition to equality comparisons. Moreover, the procedure and hardware for performing the two types of magnitude comparisons are substantially identical, the sole difference between the comparisons lying in the different states of a single flip-flop. In addition to reducing the costs of requisite sensing apparatus, use of the type of magnetic element proposed herein permits the utilization of less complex interrogation current drivers also since these elements present a linear impedance to such drivers and as a result reactive voltages on the digit lines are substantially lower than what they would be if magnetic elements, which actually have to be switched to be read, were utilized.

Although it has not heretofore been specifically pointed out, it should further be apparent that masked searches, i.e. equality searches for less than all of the bits of a search word can be performed by inhibiting the appropriate AND gates 42. For example, assume that it is desired to locate all words in memory whose bits 1, 2, 4 and 5 are equal to the corresponding bits of the search word. It is merely necessary to assure that no change in current occurs in digit line 3 since as a consequence, the elements representative of bit 3 cannot generate a positive output pulse. In order to assure this, an input (not shown) to AND gate 42 of column 3 can be made false at time $t_0$.

The embodiments of the invention in which an exclusive property or privilege is claimed are defined as follows:

1. In combination with a first binary storage element of the type respectively responsive to changes in current in opposite first and second directions on a digit line associated therewith for respectively providing pulses of opposite first and second going polarities on an output line associated therewith when said first binary storage element is in a first state and for respectively providing pulses of second and first going polarities when said first binary storage element is in a second state, apparatus for comparing the state of said first binary storage element with the state of a second binary storage element, said apparatus comprising:

means responsive to a first state of said second binary storage element for changing the current in said digit line in a first direction;

means responsive to a second state of said second binary storage element for changing the current in said digit line in a second direction; and means for sensing said output line to determine the polarity of a pulse thereon.

2. In combination with a first binary storage element of the type respectively responsive to a decrease and an increase in current on a digit line associated therewith for respectively providing pulses of opposite first and second polarities on an output line associated therewith when said first binary storage element is in a binary "0" state and for respectively providing pulses of second and first polarities when said first binary storage element is in a binary "1" state, apparatus for comparing the state of said first binary storage element with the state of a second binary storage element, said apparatus comprising:

means responsive to a binary "0" state of said second binary storage element for decreasing said current in said digit line;

means responsive to a binary "1" state of said second binary storage element for increasing said current in said digit line; and means for sensing said output line to determine the polarity of a pulse thereon.

3. In combination with a first binary storage element of the type respectively responsive to a decrease and an increase in current on a digit line associated therewith for respectively providing pulses of opposite first and second polarities on an output line associated therewith when said first binary storage element is in a binary "0" state and for respectively providing pulses of second and first polarities when said first binary storage element is in a binary "1" state, apparatus for comparing for equality the state of said first binary storage element with the state of a second binary storage element, said apparatus comprising:

means responsive to a binary "0" state of said second binary storage element for decreasing said current in said digit line;

means responsive to a binary "1" state of said second binary storage element for increasing said current in said digit line;

indicating means capable of selectively indicating that the states of said first and second binary storage elements mismatch; and sensing means connected to said output line and responsive to pulses of a second polarity thereon for causing said indicating means to indicate that the states of said first and second binary storage elements mismatch.

4. In combination with a first binary storage element of the type respectively responsive to a decrease and an increase in current on a digit line associated therewith for respectively providing pulses of opposite first and second polarities on an output line associated therewith when said first binary storage element is in a binary "0" state and for respectively providing pulses of second and first polarities when said first binary storage element is in a binary "1" state, apparatus for comparing the magnitude of the bit stored in said first binary storage element with the bit stored in a second binary storage element, said apparatus comprising:

means responsive to a binary "0" state of said second binary storage element for decreasing said current in said digit line;

means responsive to a binary "1" state of said second binary storage element for increasing said current in said digit line;

means for establishing either a "greater than" or "less than" magnitude comparison criterion manifestation; and means responsive to the establishment of a "greater than" criterion manifestation and to a pulse of a second polarity on said output line for generating a mismatch signal when said second binary storage element is in a binary "1" state and responsive to the establishment of a "less than" criterion and to a pulse of a second polarity on said output line for generating a mismatch signal when said second binary storage element is in a binary "0" state.

5. In combination with a first binary storage element of the type respectively responsive to a decrease and an increase in current on a digit line associated therewith for respectively providing pulses of opposite first and second polarities on an output line associated therewith when said first binary storage element is in a binary "0" state and for respectively providing pulses of second and first polarities when said first binary storage element is in a binary "1" state, apparatus for comparing the magnitude of the bit stored in said first binary storage element with the bit stored in a second binary storage element, said apparatus comprising:

means responsive to a binary "0" state of said second binary storage element for decreasing said current in said digit line;

means responsive to a binary "1" state of said second binary storage element for increasing said current in said digit line;

means for establishing either a "greater than" or "less than" magnitude comparison criterion manifestation;

means responsive to a pulse of second polarity on said output line for generating a mismatch signal;

means responsive to the establishment of a "greater than" criterion manifestation and the binary "0" state of said second binary element for inhibiting the generation of said mismatch signal; and means responsive to the establishment of a "less than" criterion manifestation and the binary "1" state of said second binary element for inhibiting the generation of said mismatch signal.

6. The combination of claim 5 wherein said means responsive to a pulse on said output line includes first and second binary devices, said first binary device responsive to said pulse of a second polarity to switch from a first to a second state;

means interconnecting said first and second binary devices to cause said second binary device to switch to a second state in response to said first binary device switching to said second state;

said means for inhibiting the generation of said mismatch signal connected to said second binary device for preventing said second binary device from switching to said second state in response to said first binary device switching to said second state.

7. The combination of claim 6 wherein said first and second binary devices respectively comprise first and second magnetic cores;

a drive winding on said first magnetic core connected to said output line;

a sense winding on said first magnetic core;

a drive winding on said second magnetic core;

means connecting said first magnetic core sense winding to said second magnetic core drive winding;

an inhibit winding on said second magnetic core; and means for connecting said inhibit winding to said means for inhibiting the generation of said mismatch signal.

8. The combination of claim 6 wherein said first binary device comprises a tunnel diode;

means connecting said output line to said tunnel diode for switching said tunnel diode from a low to a high voltage state in response to a pulse of a second polarity on said output line;

switch means;

means connecting said tunnel diode to said switch means for closing said switch means in response to said high voltage state of said tunnel diode;

a transformer including first and second primary windings and a secondary winding;

means connecting said first primary winding in series with said switch means;

means connecting said second primary winding to said means for inhibiting the generation of said mismatch signal; and means connecting said secondary winding to said second binary device.

9. A content addressable memory comprising:

a matrix of memory elements respectively including N rows of elements, each row comprising a memory location capable of storing a word, and Q columns of elements, each column including a corresponding memory element from each location;

Q storage elements;

a plurality of digit lines each of which is associated with all of the elements of a different one of said matrix columns and a different one of said Q storage elements;

a plurality of word lines each of which is associated with all of the elements of a different one of said matrix rows;

means for sequentially applying signals to said digit lines, each signal respectively representative of the state of a different one of said Q storage elements; and means for sensing pulses on each of said word lines.

10. A content addressable memory comprising:

a matrix of memory elements respectively including N rows of elements, each row comprising a memory location capable of storing a word, and Q columns of elements, each column including a corresponding memory element from each location;

Q storage elements;

a plurality of digit lines each of which is associated with all of the elements of a different one of said matrix rows and a different one of said Q storage elements;

a plurality of word lines each of which is associated with all of the elements of a different one of said matrix rows;

each of said memory elements being respectively responsive to signal changes in opposite first and second directions on a digit line associated therewith for respectively providing pulses of opposite first and second going polarities on a word line associated therewith when said memory element is in a first state and for respectively providing pulses of second and first going polarities when said memory element is in a second state;

means for sequentially applying signals to said digit lines, each signal respectively representative of the state of a different one of said Q storage elements; and means for sensing pulses on each of of said word lines.

11. A content addressable memory comprising:

a matrix of memory elements respectively including N rows of elements, each row comprising a memory location capable of storing a word, and Q columns of elements, each column including a corresponding memory element from each location;

a search register including Q storage elements capable of storing a search word;

a plurality of digit lines each of which is associated with all of the elements of a different one of said matrix columns and a corresponding storage element of said search register;

a plurality of word lines each of which is associated with all of the elements of a different one of said matrix rows;

each of said memory elements being respectively responsive to a signal decrease and increase on a digit line associated therewith for respectively providing pulses of opposite first and second polarities on a word line associated therewith when said memory element stores a binary "0" and for respectively providing pulses of second and first polarities when said memory element stores a binary "1";

means for sequentially applying signals to said digit lines, each signal respectively representative of the state of a different search register storage element; and means for sensing pulses on each of said word lines.

12. A content addressable memory comprising:

a matrix of memory elements respectively including N rows of elements, each row comprising a memory location capable of storing a word, and Q columns of elements, each column including a corresponding memory element from each location;
a search register including Q storage elements capable of storing a search word;
a plurality of digit lines each of which is associated with all of the elements of a different one of said matrix columns and a corresponding storage element of said search register;
a plurality of word lines each of which is associated with all of the elements of a different one of said rows;
each of said memory elements being respectively responsive to a decrease and an increase in current on a digit line associated therewith for respectively providing pulses of opposite first and second polarities on a word line associated therewith when said memory element stores a binary "0" and for respectively providing pulses of second and first polarities when said memory element stores a binary "1";
means responsive to search register storage elements storing a binary "0" for acting on the respective digit lines associated therewith to decrease the current therein;
means responsive to search register storage elements storing a binary "1" for acting on the respective digit lines associated therewith to increase the current therein;
means for causing said digit lines to be sequentially acted upon; and
means for sensing pulses of a second polarity on each of said word lines.

13. A content addressible memory comprising:
a matrix of memory elements respectively including N rows of elements, each row comprising a memory location capable of storing a word, and Q columns of elements, each column including a corresponding memory element from each location;
a search register including Q storage elements capable of storing a search word;
a plurality of digit lines each of which is associated with all of the elements of a different one of said matrix columns and a corresponding storage element of said search register;
a plurality of word lines each of which is associated with all of the elements of a different one of said rows;
each of said memory elements being respectively responsive to a decrease and an increase in current on a digit line associated therewith for respectively providing pulses of opposite first and second polarities on a word line associated therewith when said memory element stores a binary "0" and for respectively providing pulses of second and first polarities when said memory element stores a binary "1";
means responsive to search register storage elements storing a binary "0" for acting on the respective digit lines associated therewith to decrease the current therein;
means responsive to search register storage elements storing a binary "1" for acting on the respective digit lines associated therewith to increase the current therein;
means for causing said digit lines to be sequentially acted upon in order of decreasing significance; and
means for sensing the first occurrence of a pulse of said second polarity on each of said word lines and for providing a control signal responsive thereto.

14. A content addressable memory comprising:
a matrix of memory elements respectively including N rows of elements, each row comprising a memory location capable of storing a word, and Q columns of elements, each column including a corresponding memory element from each location;
a search register including Q storage elements capable of storing a search word;
a plurality of digit lines each of which is associated with all of the elements of a different one of said matrix columns and a corresponding storage element of said search register;
a plurality of word lines each of which is associated with all of the elements of a different one of said rows;
each of said memory elements being respectively responsive to a decrease and an increase in current on a digit line associated therewith for respectively providing pulses of opposite first and second polarities on a word line associated therewith when said memory element stores a binary "0" and for respectively providing pulses of second and first polarities when said memory element stores a binary "1";
means responsive to search register storage elements storing a binary "0" for acting on the respective digit lines associated therewith to decrease the current therein;
means responsive to search register storage elements storing a binary "1" for acting on the respective digit lines associated therewith to increase the current therein;
means for causing said digit lines to be sequentially acted upon in order of decreasing significance;
means for sensing the first occurrence of a pulse of said second polarity on each of said word lines and for providing a control signal responsive thereto; and
magnitude comparison means for indicating whether the magnitude of each of said stored words is greater than or less than said search word.

15. The combination of claim 14 wherein said magnitude comparison means includes means for establishing either a "greater than" or a "less than" magnitude comparison criterion manifestation; and
means responsive to the establishment of a "greater than" criterion manifestation and to the provision of a control signal on each word line for generating a mismatch signal when said control signal is provided as a result of an increase in current in a digit line and responsive to the establishment of a "less than" criterion manifestation and to the provision of a control signal on each word line for generating a mismatch signal when said control signal is provided as a result of a decrease in current in a digit line.

16. The combination of claim 14 wherein said magnitude comparison means includes means for establishing either a "greater than" or "less than" magnitude comparison criterion manifestation;
means responsive to the provision of each of said control signals for generating a mismatch signal;
means responsive to the establishment of a "greater than" criterion manifestation and a control signal resulting from a decrease in current in a digit line for inhibiting the generation of a mismatch signal; and
means responsive to the establishment of a "less than" criterion manifestation and a control signal resulting from an increase in current in a digit line for inhibiting the generation of a mismatch signal.

17. The combination of claim 16 wherein said means for sensing a pulse on each of said word lines comprises a plurality of sensing devices, each sensing device connected to a different word line and including a first binary device responsive to a pulse of said second polarity thereon to switch from a first to a second state; and
said means for generating a mismatch signal comprises a plurality of second binary devices, each second binary device being connected to a different first binary device and being responsive to the switching thereof to a second state, to thereby switch to a second state.

18. The combination of claim 17 wherein said first and second binary devices respectively comprise first and second magnetic cores;

a drive winding on each of said first magnetic cores connected to a different one of said word lines;
a sense winding on each of said first magnetic cores;
a drive winding on each of said second magnetic cores;
means connecting each of said first magnetic core sense windings to a different one of said second magnetic core drive windings;
an inhibit winding on all of said second magnetic cores; and
means for connecting said inhibit winding to said means for inhibiting generation of said mismatch signal.

19. The combination of claim 17 wherein each of said first binary devices comprises a tunnel diode;

means connecting each of said word lines to a different one of said tunnel diodes for respectively switching said tunnel diodes from a low to a high voltage state in response to pulses of a second polarity on said word lines;
a plurality of switch means;
means connecting each of said tunnel diodes to a different one of said switch means for closing each of said switch means in response to a high voltage state of the tunnel diode connected thereto;
a plurality of transformers each including first and second primary windings and a secondary winding;
means connecting each of said first primary windings in series with a different one of said switch means;
means connecting each of said second primary windings to said means for inhibiting the generation of said mismatch signal; and
means connecting each of said secondary windings to a different one of said second binary devices.

20. The combination of claim 19 wherein each of said switch means comprises a transistor; and means respectively connecting the base and emitter of each of said transistors to the terminals of a different one of said tunnel diodes.

21. In combination with a first plurality of binary storage elements, each element of the type respectively responsive to a decrease and an increase in current on a digit line associated therewith for respectively generating pulses of opposite first and second polarities on an output line associated therewith when the element is in a binary "0" state and for respectively generating pulses of second and first polarities when the element is in a binary "1" state, apparatus for comparing the magnitude of a number stored in said first plurality of binary storage elements with a number stored in a second plurality of binary storage elements, said apparatus comprising:

means connecting each of said second plurality of storage elements to a different one of said digit lines;
means responsive to each of said second plurality of storage elements storing a binary "0" for acting on the digit line connected thereto for decreasing the current therein;
means responsive to each of said second plurality of storage elements storing a binary "1" for acting on the digit line connected thereto for increasing the current therein;
means for causing said digit lines to be sequentially acted upon in order of decreasing significance of the binary digit stored in the element associated therewith; and
indicating means responsive to the initial generation of a pulse of a second polarity and to the state of the storage element of said second plurality of storage elements of the same corresponding significance as the storage element of said first plurality of storage elements generating said pulse for indicating whether the magnitude of the number stored in said first plurality of binary storage elements is greater or less than the magnitude of the number stored in said second plurality of binary storage elements.

22. In combination with a first plurality of binary storage elements, each element of the type respectively responsive to a decrease and an increase in current on a digit line associated therewith for respectively generating pulses of opposite first and second polarities on an output line associated therewith when the element is in a binary "0" state and for respectively generating pulses of second and first polarities when the element is in a binary "1" state, apparatus for comparing the magnitude of a number stored in said first plurality of binary storage elements with a number stored in a second plurality of binary storage elements, said apparatus comprising:

means connecting each of said second plurality of storage elements to a different one of said digit lines;
means responsive to each of said second plurality of storage elements storing a binary "0" for acting on the digit line connected thereto for decreasing the current therein;
means responsive to each of said second plurality of storage elements storing a binary "1" for acting on the digit line connected thereto for increasing the current therein;
means for causing said digit lines to be sequentially acted upon in order of decreasing significance of the binary digit stored in the element associated therewith;
means for sensing the initial occurrence of a pulse of said second polarity on said output line and for providing a control signal responsive thereto;
magnitude comparison means for indicating whether the magnitude of the number stored in said first plurality of binary storage elements is greater or less than the magnitude of the number stored in said second plurality of binary storage elements;
said magnitude comparison means including means for establishing either a "greater than" or "less than" magnitude comparison criterion manifestation; and
means responsive to the establishment of a "greater than" criterion manifestation and to the provision of a control signal for generating a mismatch signal when said control signal is provided as a result of an increase in current in a digit line and responsive to the establishment of a "less than" criterion manifestation and to the provision of a control signal for generating a mismatch signal when said control signal is provided as a result of a decrease in current on a digit line.

23. A content addressable memory comprising:

a matrix of memory elements respectively including N rows of elements, each row comprising a memory location capable of storing a word, and Q columns of elements, each column including a correspondingly positioned memory element from each location;
Q storage elements;
a plurality of digit lines each of which is associated with all of the elements of a different one of said matrix columns and a different one of said Q storage elements;
a plurality of word lines each of which is associated with all of the elements of a different one of said matrix rows;
means for sequentially applying signals to said digit lines for successively comparing the state of each of said Q storage elements with the states of the memory elements associated therewith to develop unique signals on those word lines associated with memory elements whose state does not match the state of the storage element compared therewith;
a plurality of first binary devices each coupled to a different one of said word lines and each responsive to the development of a unique signal on the word line coupled thereto for switching from a first to a second state;

a plurality of second binary devices;

means interconnecting said first and second binary devices to cause each of said second binary devices to switch to a second state in response to the first binary device connected thereto switching to a second state; and means for selectively inhibiting said second binary devices from switching to said second state.

References Cited by the Examiner

UNITED STATES PATENTS

| | | | |
|---|---|---|---|
| 2,973,508 | 2/1961 | Chadurjian | 340—174 |
| 3,126,529 | 3/1964 | Hempel | 340—174 |
| 3,189,879 | 6/1965 | MacIntyre | 340—174 |
| 3,195,109 | 7/1965 | Behnke | 340—172.5 |

ROBERT C. BAILEY, *Primary Examiner.*

G. D. SHAW, *Assistant Examiner.*